(12) United States Patent
Challener et al.

(10) Patent No.: US 7,389,536 B2
(45) Date of Patent: Jun. 17, 2008

(54) SYSTEM AND APPARATUS FOR LIMITING ACCESS TO SECURE DATA THROUGH A PORTABLE COMPUTER TO A TIME SET WITH THE PORTABLE COMPUTER CONNECTED TO A BASE COMPUTER

(75) Inventors: David Carroll Challener, Raleigh, NC (US); Ernest Nelson Mandese, Durham, NC (US); Hernando Ovies, Cary, NC (US); James Peter Ward, Raleigh, NC (US)

(73) Assignee: Lenovo Singapore Pte Ltd., Singapore (SG)

( * ) Notice: Subject to any disclaimer, the term of this patent is extended or adjusted under 35 U.S.C. 154(b) by 976 days.

(21) Appl. No.: 09/993,135

(22) Filed: Nov. 14, 2001

(65) Prior Publication Data

US 2003/0093698 A1 May 15, 2003

(51) Int. Cl.
*H04L 9/00* (2006.01)
*G06F 11/00* (2006.01)
(52) U.S. Cl. .......................... 726/22; 713/158; 726/27
(58) Field of Classification Search ................ 713/158; 726/27
See application file for complete search history.

(56) References Cited

U.S. PATENT DOCUMENTS

| | | | |
|---|---|---|---|
| 5,552,776 A | 9/1996 | Wade et al. | |
| 5,574,786 A | 11/1996 | Dayan et al. | |
| 5,691,928 A | 11/1997 | Okaya et al. | |
| 5,887,063 A * | 3/1999 | Varadharajan et al. | 713/172 |
| 5,889,866 A | 3/1999 | Cyras et al. | |
| 5,930,368 A * | 7/1999 | Hocker et al. | 380/52 |
| 5,935,244 A | 8/1999 | Swamy et al. | |
| 6,009,528 A * | 12/1999 | Teraoka | 726/22 |
| 6,014,747 A | 1/2000 | Fackenthall et al. | |
| 6,026,457 A | 2/2000 | Lee | |
| 6,032,258 A * | 2/2000 | Godoroja et al. | 713/178 |
| 6,085,323 A * | 7/2000 | Shimizu et al. | 713/150 |
| 6,125,446 A | 9/2000 | Olarig et al. | |
| 6,138,240 A | 10/2000 | Tran et al. | |
| 2002/0073042 A1* | 6/2002 | Maritzen et al. | 713/182 |

* cited by examiner

*Primary Examiner*—Gilberto Barron, Jr.
*Assistant Examiner*—Laurel Lashley
(74) *Attorney, Agent, or Firm*—Ronald Davidge; Carlos Munoz-Bustamante (57) ABSTRACT

Access to secure data through a portable computing system is provided only when a timer within the system is running. The timer is reset with the portable system connected to a base system, either directly, as by a cable, or indirectly, as through a telephone network. In an initialization process, the portable and base systems exchange data, such as public cryptographic keys, which are later used to confirm that the portable system is connected to the same base system. In one embodiment, the initialization process also includes storing a password transmitted from the portable system within the base system, with this password later being required within the reset process.

49 Claims, 7 Drawing Sheets

SYSTEM AND APPARATUS FOR LIMITING ACCESS TO SECURE DATA THROUGH A PORTABLE COMPUTER TO A TIME SET WITH THE PORTABLE COMPUTER CONNECTED TO A BASE COMPUTER

BACKGROUND OF THE INVENTION

1. Field of the Invention

This invention relates to preventing a loss of data through the surreptitious use of lost computing system, and, more particularly, to a method for verifying that a computing system is still under the control of a person authorized to use it before allowing access to certain data and functions.

2. Summary of the Background Information

As personal computers become lighter in weight and smaller in size, increasing numbers of computer users rely on a desktop computer for use in the office and a portable computer for use in other locations, such as at home or while traveling. In many instances, the portable computer, as well as the desktop computer, is used to generate or otherwise use sensitive data protected by cryptographic methods, with a number of techniques of encryption and decryption having been developed to provide secure communications between computing systems. Of particular significance is the development of asymmetrical encryption algorithms, in which the key used to decrypt a message cannot be reasonably determined from the key used to encrypt the message, and the development of public key cryptography, in which a first computing system stores a public key, which is made available to a second computing system sending a message to the first computing system, and a private key, which is held within the first computing system itself. A message encrypted with the public key is decrypted with the private key, and a message encrypted with the private key is decrypted with the public key.

For example, a message to be sent in a secure form is encrypted by the second system using the public key of the first system, is transmitted in encrypted form to the first system, and is decrypted within the first system using the private key of the first system. While the private key decrypts a message encrypted by the public key, due to asymmetry of the algorithm, the private key cannot be deduced from the public key.

Alternately, these cryptographic algorithms can be used to verify the identity of a computing system sending a message, with the message being encrypted, for example, by the second system using its own private key. The message is then decrypted within the first system using the public key of the second system. This method forms a part of the process normally known as providing a digital signature.

Both software and hardware solutions for protecting sensitive data are becoming increasingly effective in both desktop and portable systems. For example, both desktop and laptop systems including security chips are now available. A security chip includes a cryptographic processor and secure storage for storing a number of cryptographic keys and key pairs. In a system having a security chip, at least the private keys are stored securely, in a memory that can be accessed only by the cryptographic processor. Cryptographic processes using these keys are carried out only within the cryptographic processor. Passwords may also be stored in such secure storage.

Nevertheless, the main advantage of the portable computer, its light weight and small size, becomes it major liability in terms of data security, as it can be easily stolen or otherwise lost. Furthermore, a person who comes into possession of a stolen computer can begin a leisurely process of learning the secrets it holds and the secrets it can access. For example, a number of methods can be used to locate passwords stored within a computer. Thus, what is needed is a method to prevent at least certain types of operation of a computer which has become lost or stolen.

U.S. Pat. Nos. 5,691,928 and 5,935,244 describe methods of securing the use of portable computers by allowing them to be fully functional only when they are connected to a detachable device. In U.S. Pat. No. 5,691,928, the detachable device is a security module removably coupled to the main chassis of the portable computer and containing circuitry for enabling decryption of encrypted data stored within the portable computer and for coupling the source of electrical power to the data processing and volatile storage circuitry only with the security module coupled to the main chassis of the portable computer. In U.S. Pat. No. 5,935,244, the detachable device is an input/output (I/O) device that functions as a conventional computer interface when docked to the portable computer. Problems with these methods arise from the fact that the rightful user of the portable computer often has a need to use the full features of his system in a remote location. If he carries a removable device, such as the security module along with the computer, there is a risk that the removable device may become lost or stolen with the computer. If he leaves the removable device behind in his office, he will not be able to use important features of his portable computer while he is gone. Thus, what is needed is a means for periodically verifying that the rightful user is in possession of the portable computer before certain features can be enabled, with such verification being possible whether the portable computer is in its home office or in a remote location, and with such verification not depending on a removable module that can be stolen with the portable computer.

U.S. Pat. No. 5,574,786 describes a personal computing system storing a privileged access password, a tamper detection switch for detecting opening of a normally closed enclosure, and a movement monitoring switch. When the movement monitoring switch detects movement of the system while the switch is enabled, and when the tamper detection switch detects opening of the enclosure, power-up of the system is prevented until the privileged access password (or a power-on password) is successfully entered into the system by a user. For a portable system, which by nature is often carried around, the mechanics using a power-on password after the system is moved place a burden on the legitimate system user. Therefore, what I needed is a method for determining if the portable system is being operated by this user, regardless of whether it has been moved.

U.S. Pat. No. 6,125,446 describes a method and system for enabling and disabling automatic encryption engines or algorithms using a Global Positioning System for verification of the country or locale of system operation, in order to assure compliance with federal encryption and export status. While this method provides for such compliance, what is needed is a method for verifying that the legitimate system user is in possession of a portable computing system.

U.S. Pat. No. 5,889,866 describes a method and apparatus for controlling access to a detachably connectable computer device using encryption. The method and apparatus include a connector for coupling the device to a computer, an input device, such as a keyboard, for receiving a password from a user, encrypting logic within the detachably connectable device for encrypting the password, and, also within the detachably connectable device, comparing logic for comparing the received password with a key. The key is determined by encrypting a user-assigned password and storing it as the key. Further included is circuitry for determining whether the received password corresponds to the key, and circuitry for sending an enable signal to configuration logic of the detachably connector computer device, upon a determination that the received password corresponds to the key. In the absence of such a determination, critical functions of the device, such as functions allowing access to data, remain disabled. This method prevents the use of the detachably connectable device by someone not knowing the password.

U.S. Pat. No. 5,552,776 describes a security system, using microprocessor control, non-volatile memory, and a real-time clock for controlling access to computing devices, such as data storage devices, microprocessors, and peripheral boards, which may be fixed to, or removable from, a computing system.

Thus, while the methods of U.S. Pat. Nos. 5,889,866 and 5,552,776 prevent the surreptitious use of a device that must be connected to a computing system to operate, what is needed is a method for protecting a separate computing system, which can otherwise function independently from a particular computing system, from such use.

SUMMARY OF THE INVENTION

In accordance with a first aspect of the present invention, a method provides access to secure data through a portable computing system during a specified time. The method includes establishing a connection between said portable computing system and a base computing system to provide for transfer of data between said portable computing system and said base computing system, verifying identity of said base computing system within said portable computing system, resetting a timer within said portable computing system to run for a specified time, and providing access to said secure data only when said timer is running.

The step or verifying identity of said base computing system preferably includes receiving and storing a public cryptographic key from said base computing system during an initialization process, following said initialization process, generating a random number within said portable computing system, transmitting said random number to said base computing system, receiving a number transmitted from said base computing system, decrypting said number transmitted from said base computing system to form a decrypted number; and determining that said decrypted number matches said random number.

The method may additionally include a step of verifying whether a password is entered correctly. This step includes transmitting an initial password to said base computing system during an initialization process, storing said initial password within said base computing system, following said initialization process, transmitting a present password to said base computing system, determining in said base computing system that said initial password matches said present password, transmitting an approval code from said base computing system to said portable computing system, and determining that said approval code has been received.

DETAILED DESCRIPTION OF THE INVENTION

Figure 1:
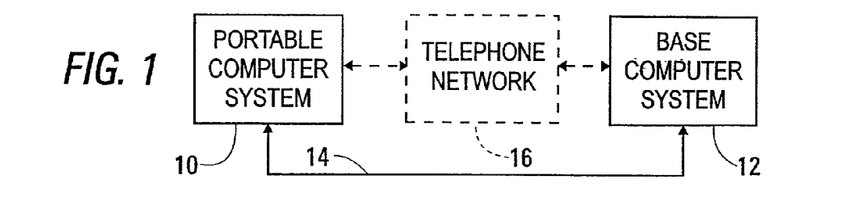
FIG. 1 is a block diagram of a portable computing system connected to a base computer system for executing a process setting a security timer feature within the portable computer in accordance with the invention.

FIG. 1 is a block diagram showing a portable computing system 10 connected to a base computing system 12 for executing a process setting a security timer feature within the portable computing system 10. The computing systems 10, 12 may be directly connected, using, for example, a cable 14 extending between the systems 10, 12, or a docking station (not shown) electrically connected by a cable to the base computing system 12 and making a number of detachable connections with the portable computing system 10. Alternately, the computing systems 10, 12 may be indirectly connected, as over telephone network 16.

The base computing system 12 is, for example, a desktop system or other form of computing system or terminal, which is generally left in one position, while the portable computing system 10 is typically a laptop or notebook computer or a PDA (personal data assistant), which is carried by the user. Because of the small size of the portable computing system 10, and because it is carried into so many environments, such a device may often be stolen. In order to be useful to its rightful user, the portable computing system 10 may itself store confidential data and may further be used as a means to access remotely located confidential data. Therefore, the security timer feature of the present invention is used to assure that the portable computing system 10 cannot be used to continue access to secure data if it is not reconnected to the base computing system 12 on a periodic basis, which such reconnection providing an indication that the portable computing system 10 remains in the possession and control of its rightful user.

In general, the portable computing system 10 should be considered to be the more easily lost of the two computing systems 10, 12, regardless of its type or construction.

The computing systems 10, 12 preferably exchange public cryptographic keys the first time the security timer setting process of the present invention is run. This process requires the execution of a base system routine within the base computing system 12 and of a portable system routine within the portable computing system 10, with the systems 10, 12 interconnected as shown in FIG. 1. This key exchange process has the effect of registering the base computing system 12 with the portable computing system 10 so that the security timer feature of the portable computing system 10 cannot be reset using another base system 10. After this initial key exchange, the portable computing system 10, which securely stores the public key of the base computing system 12, recognizes the operation of the security timer reset process only when a number is generated by the portable computing system 10 is encrypted using the private key of the base computing system 12 and returned to the portable computing system 10, indicating that a connection has indeed been made with this particular system 12. Thus, even if the portable computing system 10 is lost, its security timer feature cannot be reset by this process, assuming that the rightful user of the portable system 10 retains control of the base computing system 12. A user retaining such control and realizing that the portable computing system 10 has been lost is able to prevent the base computing system 12 from performing its part of the security reset process.

The security timer setting process allows the user to set a number specifying a time within a register of the portable computing system 10. This number is then decremented to provide the timer function. If this number is decremented to zero, indicating that a set time has elapsed, the portable computing system 10 goes into a mode in which various restricted functions, such as accessing confidential data within or outside the system 10, cannot be performed. If the security timer setting process is repeated before this time has elapsed, the ability to access such information is retained, and the time may be reset to run for a different time duration. Preferably, this process may be initiated using the portable computing system 10, whether the systems are physically adjacent and directly connected, or remote from one another and connected over the Internet.

Figure 2:
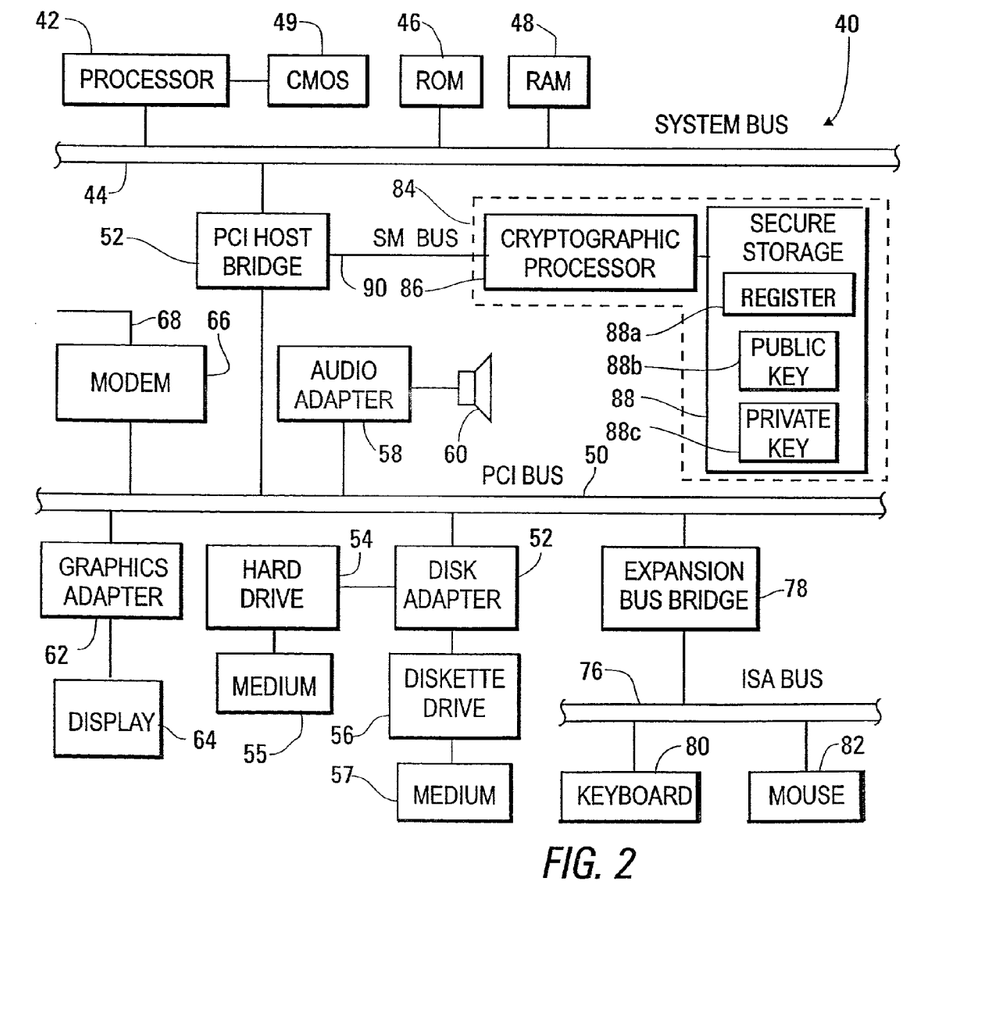
FIG. 2 is a block diagram of a computing system which is exemplary of either the portable computing system or the base computer system in FIG. 1.

FIG. 2 is a block diagram of a computing system 40 in which the present invention may be practiced, being exemplary of either the portable computing system 10 or the base computing system 12. For this reason, common reference numerals are used to refer to various components within both of these computing systems 12. While the computing system 40 is exemplary in this way, it is not necessary for the computing systems 10, 12 to include the same components, with various of the components shown in FIG. 2 being desirable but not necessary for carrying out the invention.

The computing system 40 includes a microprocessor 42, which is connected to a system bus 44. Other components connected to the system bus 44 include a read-only memory (ROM) 46 and a random access memory (RAM) 48. An electrically erasable programmable read-only memory (EEPROM) may be used in place of a read-only memory. The microprocessor reads information within both the ROM 46 and the RAM 48, executing program instructions stored within these memory devices, reading data from these devices 46, 48, and recording data in the RAM 48. The ROM 46 stores a basic input output system (BIOS), which is used to initialize various functions within the system 40. While the data stored in a read-only memory cannot be changed, it is seldom necessary to change the BIOS program. Even when such a change is made possible through the use of an EEPROM, it is seldom made.

The microprocessor 42 also accesses data stored in a battery-backed complementary metal oxide semiconductor (CMOS) memory 49. Data is written to and read from the CMOS memory 49 through a pair of input/output ports of the microprocessor 42. The CMOS memory 49 is particularly used to store configuration data describing various components within the system 40. Since such data must remain available when electrical power to the system 40 has been turned off and back on, such data cannot be stored within the RAM 48, which loses data when electrical power is turned off. Yet, as the configuration of the computing system 40 is updated or otherwise changed, the configuration data stored in the CMOS memory 49 must be changed by methods provided during execution of the BIOS program. According to a preferred version of the present invention, this data includes a flag bit, which is used to determine whether the selective encryption feature of the present invention will be used to provide file security.

Various other devices are connected to a peripheral component interconnect (PCI) bus 20 within the computing system 40. The PCI bus 50 is connected to the system bus 54 through a PCI host bridge 52. Devices connected to the PCI bus 50 include a disk adapter 52, which is used to transfer information in either direction between the PCI bus 50 and either a hard disk drive 54 having disk media 55, which typically include a number of disks, or a diskette drive 56, which accepts a removable diskette medium 57, an audio adapter 58, driving one or more system speakers 60, a graphics adapter 62, driving a display device 64, and a modem 66, providing a connection to a telephone line 68. The computing system 40 also includes an industry standard architecture (ISA) bus 76, which is connected to the PCI bus 50 through an expansion bus bridge 78. A keyboard 80 and a mouse 82, or other pointing device, are connected to the ISA bus 76.

Furthermore, the computing system 40 includes a security chip 84, which is of particular importance in implementing a preferred version of the present invention. The security chip 84 includes a cryptographic processor 86 and secure storage 88. The secure storage 88 is particularly used to store cryptographic keys, which are used in cryptographic operations carried out within the cryptographic processor 86. In particular, cryptographic operations may include the application of the RSA encryption algorithm, using a private key and a public key. At least the private key is stored only within the secure storage 88, so that it is not accessible to other programs executing within the computing system. A substantial level of security is achieved in this way, since the private key cannot be accessed surreptitiously, as by a Trojan horse program. Since the private key must not be transmitted outside the security chip 84, all of the operations involving its use must take place within the cryptographic processor 86 of the security chip 84. The cryptographic processor 86 is connected to the PCI host bridge 52 through the system management bus (SMB) 90, which is a serial bus operating at less that 1 MHz. While the capabilities of this bus are sufficient for the intended application, its data transfer rate discourages the encryption of large quantities of data within the cryptographic processor 86.

In accordance with a preferred version of the invention, both the portable computing system 10 and the base computing system 12 include a security chip 84 having secure storage 88 with several storage positions set aside for data used during the execution of the routines of the invention. For example, each secure storage 88 may include a storage location 88a in which a password is stored, a storage location 88b in which a private key is stored, and a storage location 88c in which a public key is stored. Preferably, these locations are used both to identify the system making a connection as the system allowed to operate in accordance with the invention, and to provide protection against discovery of data being transmitted. For, example, a register 88a in the base computing system 12 is used to store a password provided by the portable computing system 10. Preferably, this password is not stored within the portable computing system 10, but is rather remembered by the authorized user and provided as a user input each time the security reset process accomplished. The portable computing system 10 stores its own private key in a private key storage location 88b, and, after public keys are exchanged according to the invention, stores the public key of the base computing system 12 in its public key storage location 88c. Similarly, the base computing system 12 stores its own private key in its private key storage location 88b, and, after the public key exchange, stores the public key of the portable computing system 10 in its public key storage location 88c. In the portable computing system 10, the register 88a is used to store a counter number which is decremented to perform a timer function, and which is restored to provide a user-selected time during the security reset operation.

The preceding discussion describes a construction which is desirable, but which is not necessary for carrying out the present invention. For example, particularly if the portable computing system is a PDA, it may not include a hard disk drive 54, with the function of such a device being carried out by a nonvolatile memory, such as a flash memory. In any case, both the hard disk drive 54 and the nonvolatile memory function as computer readable media in which program instructions may be loaded for execution in the processor 42. Another example of computer readable media is found in the removable medium 57, in which such instructions may be stored for loading to the hard disk drive 54.

Figure 3:
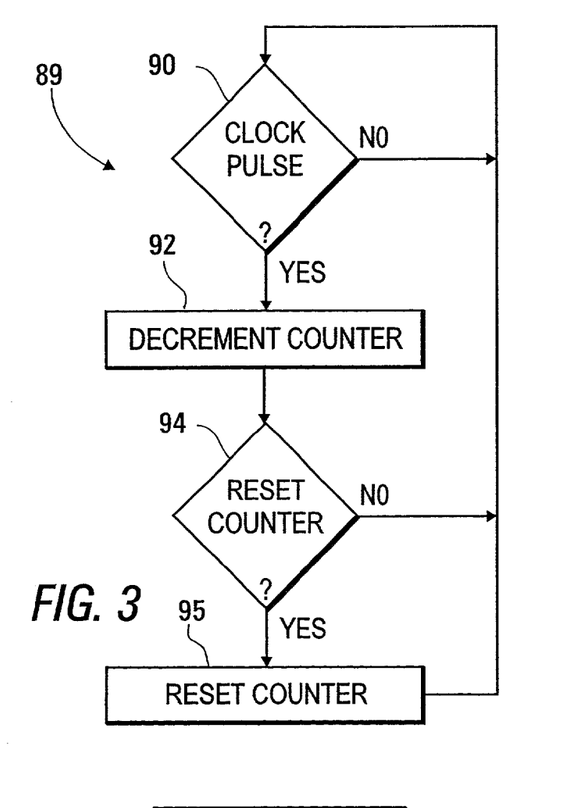
FIG. 3 is a flow chart of a security timer subroutine executing in the background within the portable computing system of FIG. 1 in accordance with the invention.

FIG. 3 is a flow chart of a security timer subroutine 89 executing in the background within the portable computing system 10 in accordance with the present invention. This program uses clock pulses, such as the clock pulses used to drive the time-of-day clock function, to decrement a counter. In a typical computing system such pulses are generated using the output of an oscillator provided for this purpose as part of a circuit which is driven by a battery even when the main source of electrical power to the portable computing system 10 is turned off. Other oscillators within the typical computing system do not operate when the main power is turned off.

Thus, after it is determined in step 90 that a clock pulse is occurring, a number stored in a register 88a (shown in FIG. 2) of a counter is decremented in step 92. Also, when it is determined in step 94 that a signal indicating that the register is to be reset is provided from a security timer reset program executing within the portable computing system 10, the number in the register is reset in step 95 by being replaced with a number provided by the security reset program.

Preferably, the counter register 88a is within secure storage 88 of the portable computing system 10, with the security timer subroutine executing within an associated cryptographic processor 86. In this way, even a Trojan horse program executing within the processor 42 of the portable computing system 10 cannot change the number stored within the register.

Figure 3A:
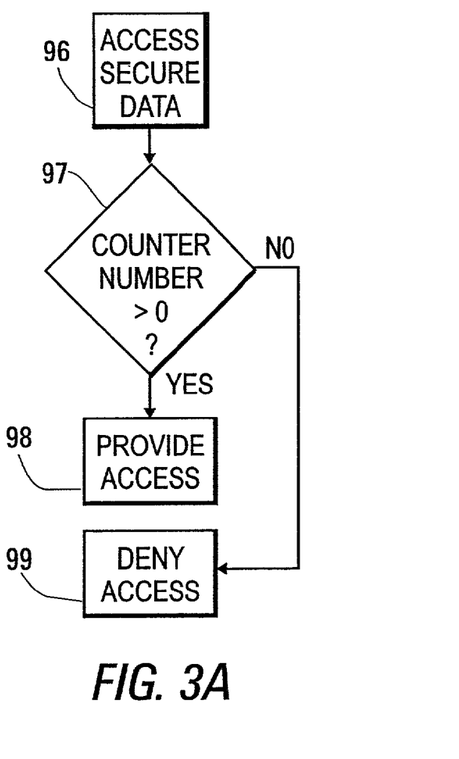
FIG. 3A is a flow chart showing a modification to a subroutine executing within the portable computing system of FIG. 1 to provide for operation in accordance with the present invention.

FIG. 3A is a flow chart showing a modification to a subroutine executing within the portable computing system 10 to provide for operation in accordance with the present invention. In a subroutine used to access secure data in step 96, a determination is made in a following step 97 of whether the number within the counter register 88a is greater than zero. If it is greater than zero, the counter is known to be still running; otherwise its time has elapsed. Thus, if this number is greater than zero, access to the secure data is provided in step 98; otherwise access is denied in step 99. The secure data may be stored within the portable computing system 10 or within another system accessed through the portable computing system 10.

Figure 4:
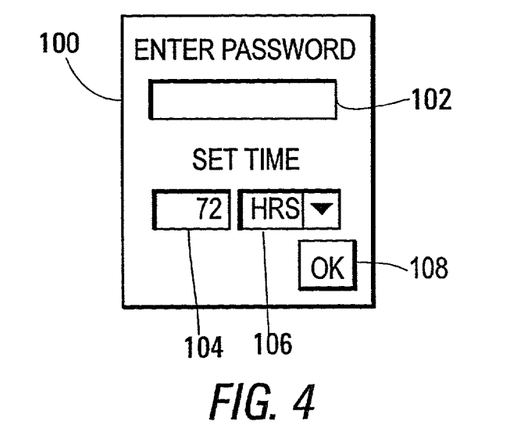
FIG. 4 is a screen view of a dialog box displayed on the display of the portable computing system of FIG. 1 in accordance with a first embodiment of the invention.

FIG. 4 is a screen view of a dialog box 100 displayed on the display 64 of the portable computing system 10 to provide for the user entry of data required to execute the security reset program. The dialog box 100 includes a password entry box 102 and a time entry box 104 for entering a length of time during which the timer within the portable computing system 10 is to be reset to retain operation of its full security features before it is necessary to run the security reset program again. The dialog box 100 also includes a drop-down list box 106 for choosing the time units represented by the number in the time entry box 104, such as days, hours, or minutes, and a button 108 that is selected when the user is satisfied with the data which has been entered in the boxes 102, 104, and 106.

In this way, a user interface is provided for controlling the security reset process. A password, originated by the user, must be entered within the password entry box 102 the first time the security reset process occurs, and the same password must be entered within the entry box 102 each succeeding time the security reset process is invoked. This password is securely stored within the base computing system 12, preferably within its secure storage 88, and is not stored within the portable computing system 10 after it is transmitted from the portable computing system 10 to the base computing system 12. In this way, the password can be used each time to assure that the authorized user, who originated the particular password, or conceivably his agent, who has been given the password, is attempting to reset the security features of the base computing system 12. An unauthorized person possessing the portable computing system 10 cannot use its data to determine the password because it is not stored within this system 10.

Figure 5:
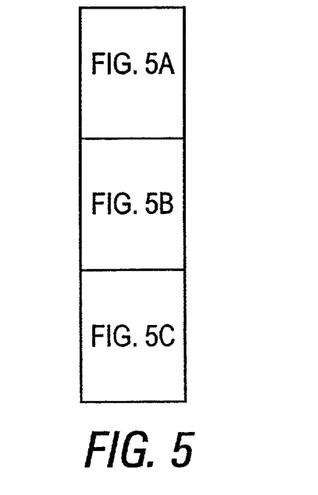
FIG. 5 is a flow chart of a process occurring in the portable computing system and the base computing system of FIG. 1 in accordance with the first embodiment of the invention.
Figure 5A:
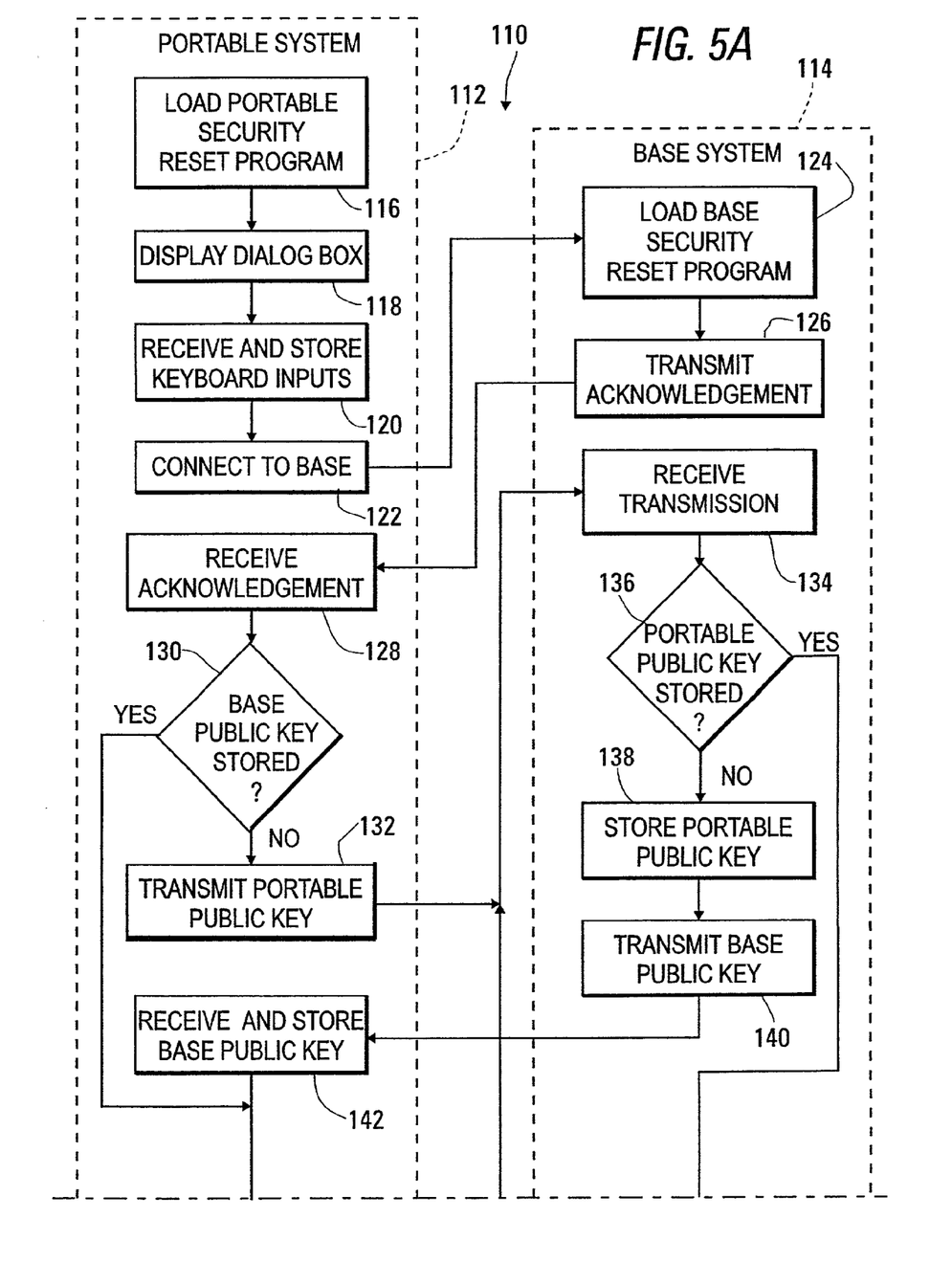
FIG. 5A is an upper portion of FIG. 5.
Figure 5B:
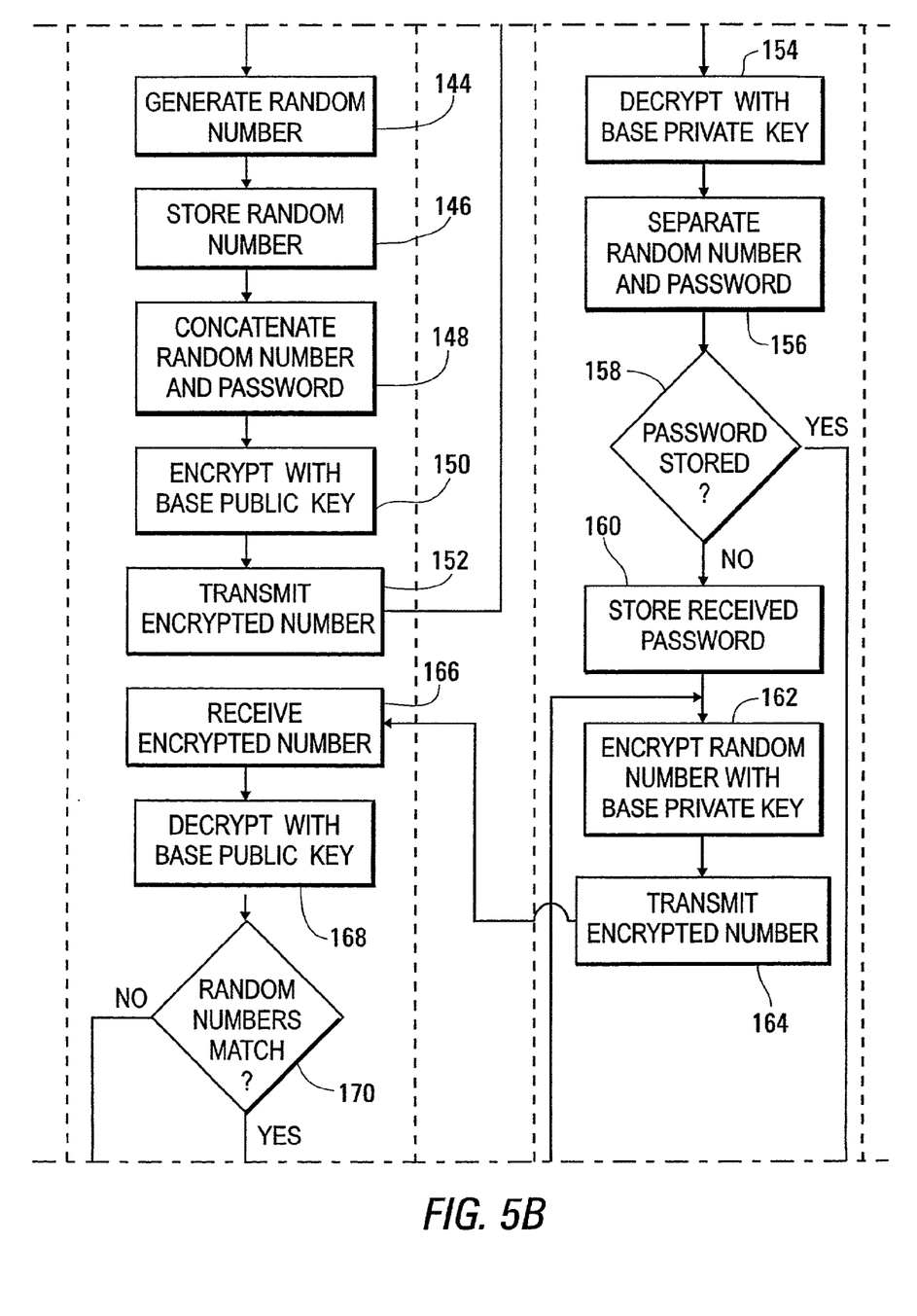
FIG. 5B is a central portion of FIG. 5.
Figures 5C, 6:
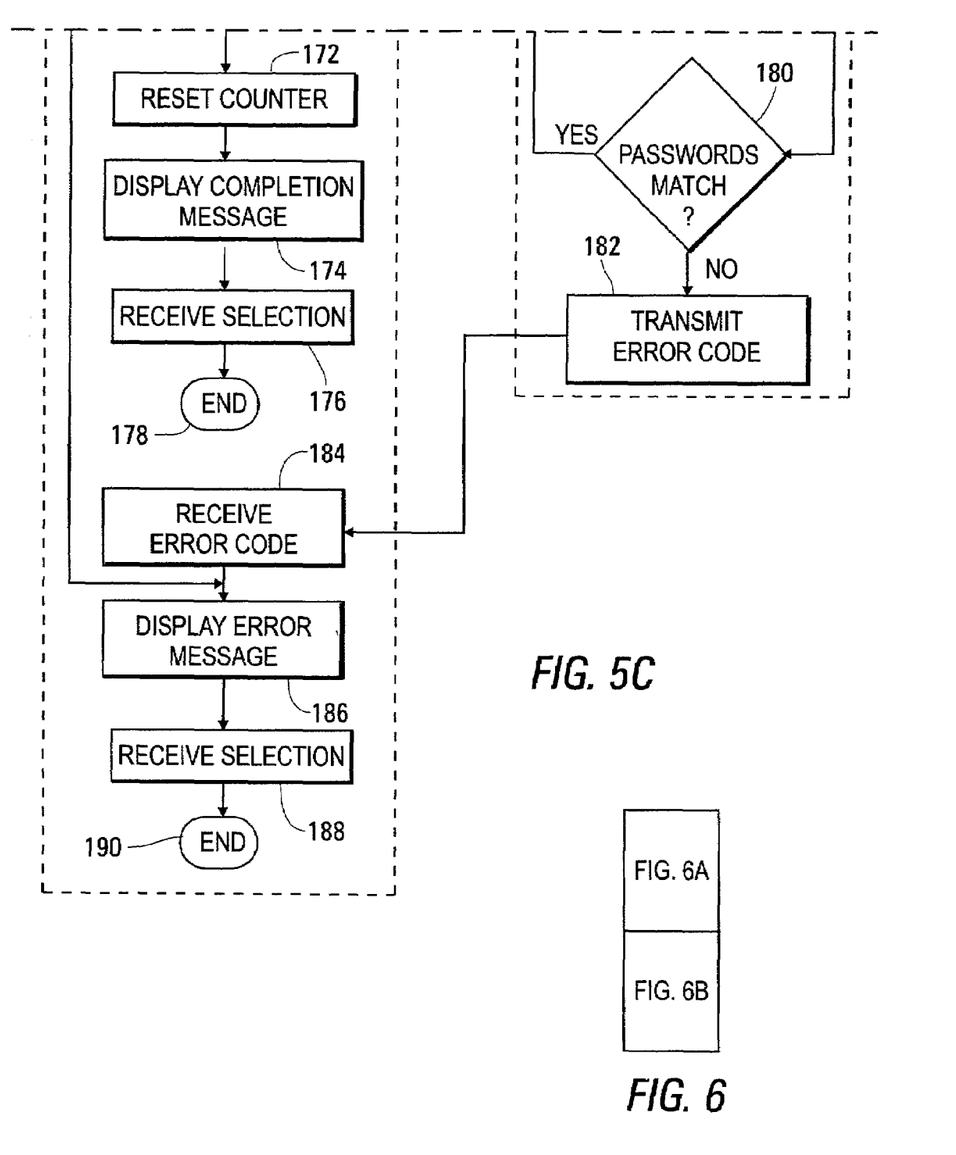
FIG. 5C is a lower portion of FIG. 5.
FIG. 6 is a flow chart of a process occurring in the portable computing system and the base computing system of FIG. 1 in accordance with the second embodiment of the invention.

FIG. 5 is a flow chart of a process 110 occurring in the portable computing system 10 and the base computing system 12 during execution of a security reset process in accordance with a first embodiment of the present invention. FIG. 5A shows an upper portion of FIG. 5, while FIG. 5B shows a central portion thereof, and while FIG. 5C shows a lower portion thereof. Process steps occurring within the portable system 10 are shown within a first rectangle 112, while process steps occurring within the base system 12 are shown within a second rectangle 114. For the processes of FIG. 5 to occur, the portable computing system 10 must have a portable version of the security reset program installed and stored, for example, in its hard disk drive 54, available for loading into RAM 48. Similarly, the base computing system 12 must have a base version of the security reset program installed and stored, for example, in its hard disk drive 54, available for loading into RAM 48.

The process of FIG. 5 begins in step 116, with the system user loading the portable security reset program. The loading process is conventional, beginning, for example, with an icon being selected from a computer screen, and causing executable instructions to be read from the hard disk drive 54 of the portable computing system 10 and stored within the RAM 48 of this system 10 for execution within the processor 42. When the program loading process of step 116 is completed, the dialog box 100, described above in reference to FIG. 4 is displayed in step 118. Preferably, a number representing a time is always displayed in the time entry box 104 when the dialog box 100 displayed. The first time the program is run, this number initially has a default value. Any value stored in the time entry box 104 can be changed by overwriting with entries through the keyboard 80 of the portable computing system 10. The user also has to provide a password entry to the password entry box 102 by means of the keyboard, and, optionally, he can change the units by selecting an entry from the drop down list box 106. As the user makes keyboard inputs, they are received and stored in step 120. When he indicates that he is finished with the dialog box 100 by selecting the button 108, the portable computing system 10 proceeds to step 122, in which it establishes a connection to the base computing system 12.

As described above in reference to FIG. 1, these computing systems 10, 12 may be connected directly, as by a cable 14, or indirectly, as through the telephone network 16. In either case, for step 122 to be successfully completed, the base version of the security reset program must be installed within the base computing system 12, being stored, for example in the hard disk drive 54 thereof. In addition, the base computing system 12 must be turned on for normal operation or in a suspense mode in which it is capable of responding to a connection request from the portable computing system 10. Following the establishment of such a connection, the base computing system 12 loads the base version of the security reset program in step 124. When this program loading process is completed, the base system 12 transmits an acknowledgment signal to the portable computing system 10 in step 126.

After receiving the acknowledgment signal in step 128, the portable computing system 10 determines, in step 130, whether a base system public key is stored in a specific location provided for this purpose, such as storage location 88c, which is preferably within the secure storage 88 of the portable computing system 10, where it cannot be erased surreptitiously. If a key is not stored within this location 88c, the exchange of public keys between the portable computing system 10 and the base computing system 12 is known not to have occurred, so the public key of the portable computing system 10 is transmitted to the base computing system 12 in step 132.

Having previously transmitted an acknowledgement in step 126 and having received a transmission in step 134, the base computing system 12 proceeds to determine, in step 136, whether a public key of a portable system is stored within its own specific location 88c provided for this purpose, which is preferably within the secure storage 88 of the base computing system 12. If a key is not found in this storage location 88c, it is known that the exchange of public keys has not previously occurred, so the public key of the portable computing system 10, transmitted in step 132 is stored at this location 88c of the base computing system 12 in step 138, and the public key of the base computing system 12 is transmitted in step 140.

Then, after the portable computing system 10 receives the base system public key in step 142, having determined in step 130 that a base system public key was not previously stored in the location 88c of the portable computing system 10, the portable computing system 10 stores the public key received from the base computing system 10 in this location 88c, completing the key exchange process.

After the key exchange process has been completed, either during the present occurrence of the security reset program, as explained above through the key exchange process ending with step 142, or previously, as indicated by a determination in step 130 that a base public key has previously been stored in the location 88c provided for such storage, the portable computing system 10 begins a security reset routine, starting with the generation of a random number in step 144. Then, in step 146, the random number is stored. Next, in step 148, the random number is concatenated with the password temporarily stored in step 120. In step 150, this concatenated number is encrypted with the public key of the base computing system 12, which has been stored in location 88c during step 142 of this occurrence of the security reset program or during a previous occurrence of the security reset program. Then, in step 152, the encrypted number is transmitted to the base computing system 12.

In step 134, the base computing system 12 receives the transmission of the encrypted number. Next, in step 136, a determination is made of whether the base computing system 12 has a portable public key held in its secure storage location 88c. If it does, and it should, since the key exchange has already occurred, the base computing system 12 proceeds to step 154, in which the encrypted number transmitted in step 152 is decrypted using the private key of the base computing system 12, which is read from storage location 88b of the base computing system 12. Then, in step 156, the password and random number concatenated in step 148 are separated.

Following step 156, if this is the first occurrence of the security reset program, the base computing system does not have a password stored in its secure storage 88 in a location 88a provided for this purpose. While the key exchange must have occurred to reach this step 156, the password could not be securely transmitted from the portable computing system 10 until after the portable computing system 10 received the public key of the base computing system 10. Thus, after a determination is made in step 158 of whether a password is stored in the secure storage location 88a of the base system 12. If there is no stored password, the password transmitted in step 152 is stored in secure storage location 88a of the base computing system 12, in step 160. Then, in step 162, the random number, which has been separated from the password in step 162 is encrypted with the public key of the base computing system 12. Next, in step 164, this encrypted number is transmitted to the portable computing system 10. Execution of the base system version of the security reset program within the base computing system 12 ends after the encrypted number is transmitted in step 164.

After receiving this encrypted number in step 166, the portable computing system 10 decrypts, in step 168, the number using the public key of the base computing system 12, which has been stored in secure storage location 88c of the portable computing system 10. Next, a determination is made in step 170 of whether the random number formed by decryption in step 168 matches the random number generated in step 144. If these random numbers match, it is known that the base computing system with which the connection was made is in fact the base computing system 12 that caused its public key to be stored in the secure storage location 88c of the portable computing system 10, so the portable computing system 10 proceeds to step 172, in which the security timer subroutine 89 is called to reset the counter number stored in the secure storage register 88a of the portable computing system 10 to a value determined from the keyboard inputs stored in step 120. Then, in step 174, a message indicating that the security reset program has been successfully completed is displayed on the display unit 64 of the portable computing system 10. The display presented on the screen also includes a button which is selected by the user when he is finished reading the message. After receiving this selection in step 176, the program executing within the portable computing system 10 ends in step 178.

On the other hand, if it is determined in step 158 that a password has previously been stored in secure storage 88 of the base computer system 12, a determination is made in step 180 of whether the password transmitted as a portion of the encrypted number in step 152 matches the password stored in the base computing system 12. If these passwords match, the base computing system 12 proceeds to step 162 and proceeds as described above.

If a determination is made in step 180 that the password transmitted as a portion of the encrypted number in step 152 does not match the password stored in the base computing system 12, the base computing system 12 proceeds to step 182, in which an error code is transmitted to the portable computer system 184. Execution of the base system version of the security reset program within the base computing system 12 ends after the encrypted number is transmitted in step 164 or after the error code is transmitted in step 182. Upon receiving the error code in step 184, the portable computer system 10 causes an error message to be displayed on its display unit 64 in step 186. The display presented on the screen also includes a button which is selected by the user when he is finished reading the message. After receiving this selection in step 188, the program executing within the portable computing system 10 ends in step 190.

Thus, secure information which can otherwise be accessed through the portable computing system 10 is protected by preventing the security reset process at a preset time after the portable computing system 10 is determined to be lost. The portable computing system 10 can only be reset in this way through connection to the particular base system 12, since the public key of this base system 12 is stored in the storage location 88c. With the first embodiment of the present invention, a first type of protection arises from the fact that the authorized user of the portable system 10, knowing that this system 10 has become lost but retaining control of the base system 12, can prevent the reset process by disabling operation of the base version of the base version of the security reset program within the base computing system 12. This program can be disabled by making an appropriate selection on a menu screen (not shown) or by uninstalling the program. A second type of protection arises from the fact that a password is needed, so that a person finding or stealing the portable computing system 10, not knowing the password, cannot cause the reset process to occur.

Figure 6A:
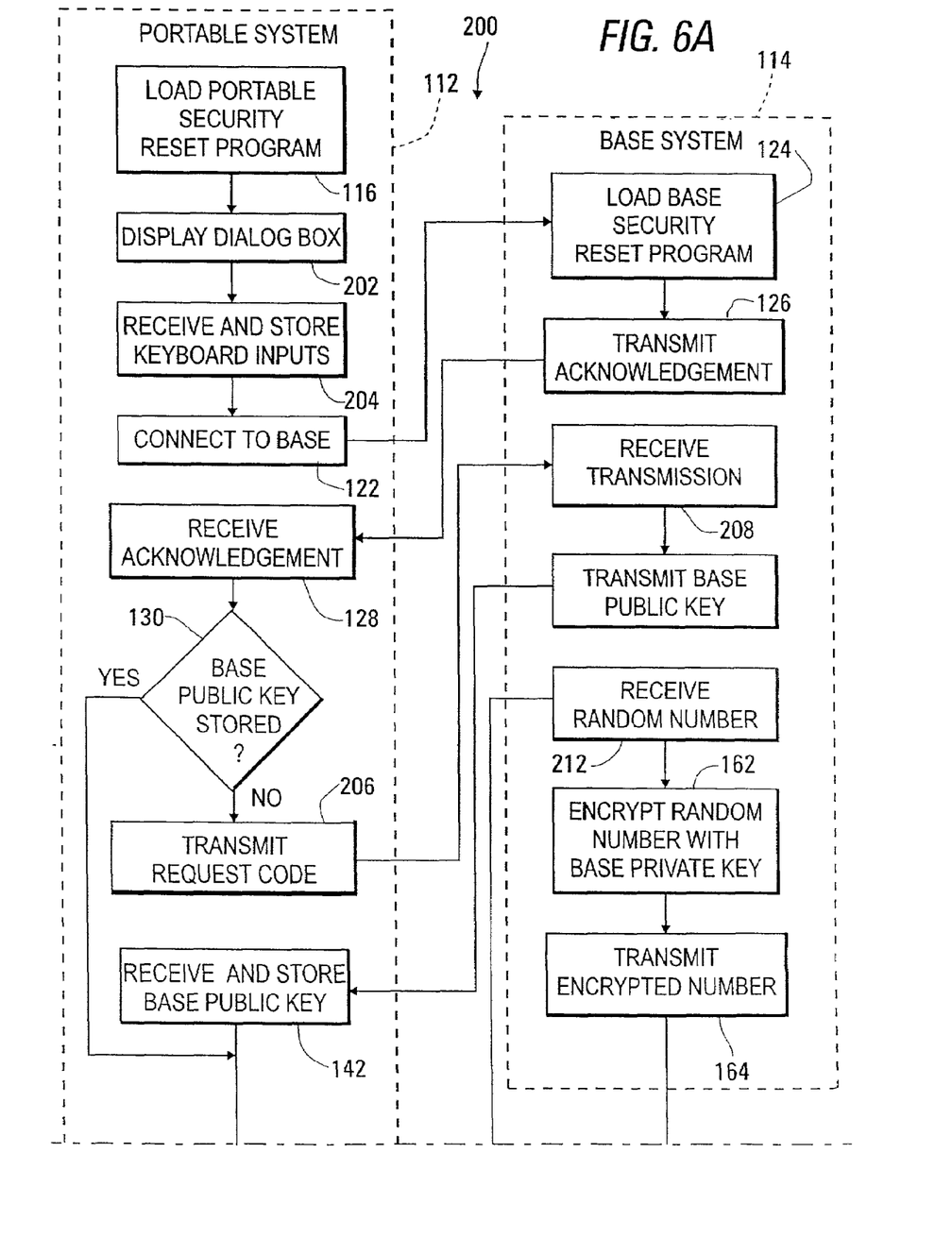
FIG. 6A is an upper portion of FIG. 6.
Figure 6B:
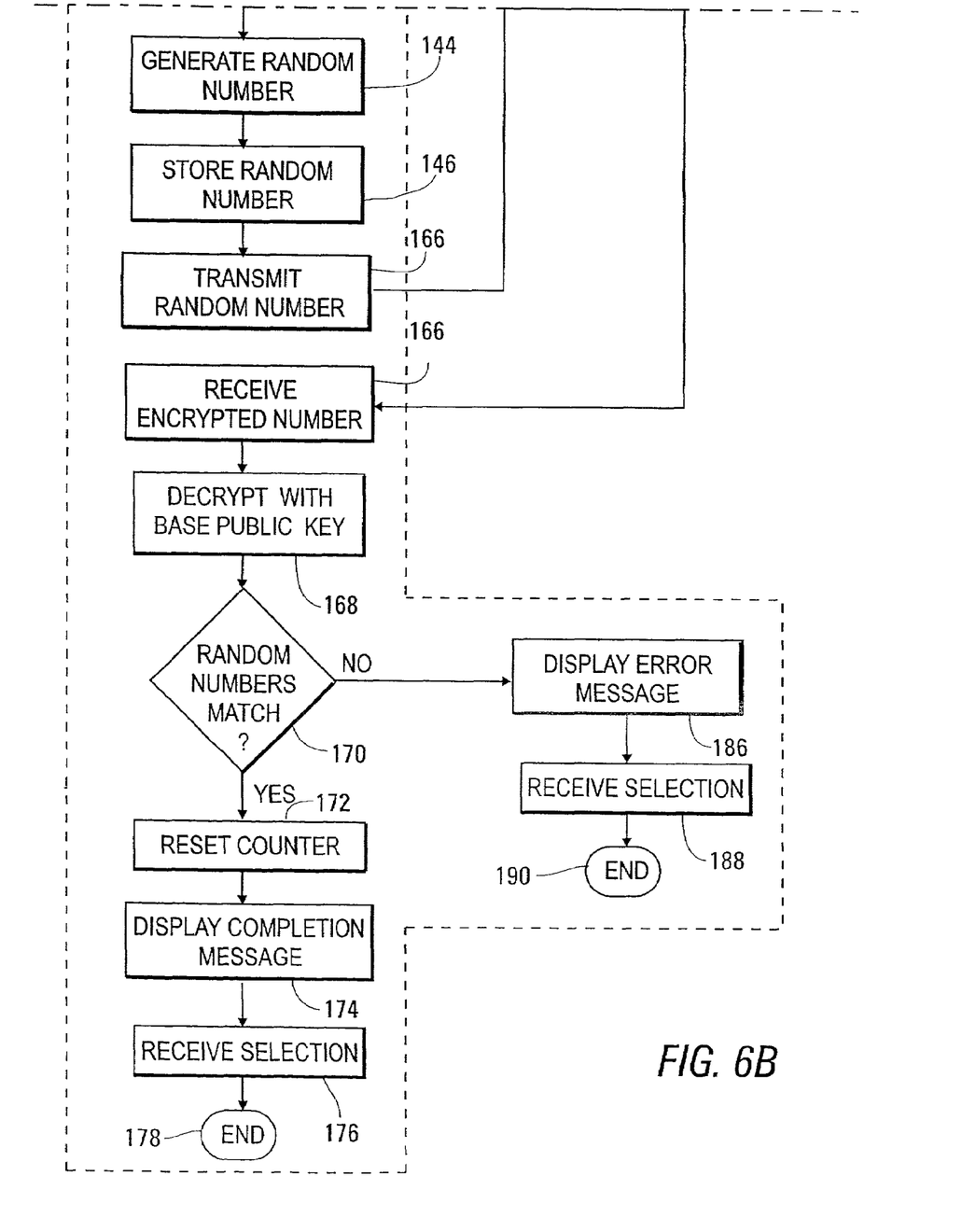
FIG. 6B is a lower portion of FIG. 6

FIG. 6 is a flow chart of a process 200 occurring in the portable computing system 10 and the base computing system 12 during execution of a security reset process in accordance with a second embodiment of the present invention. FIG. 6A shows an upper portion of FIG. 6, while FIG. 6B shows a lower portion thereof. The second embodiment of the invention is similar to the first embodiment, except that a password is not required, so that data security depends on the first type of protection described above, without the additional protection of the second type of protection. In addition, the public key of the portable computing system 10 is not stored in the example of the second embodiment, since it is not needed for this security process. Because of the similarity between the first and second embodiments, like reference numbers are used for similar process steps, and the following description is particularly directed at differences between the embodiments.

In the process 200 of the second embodiment, step 116, in which the portable security reset program is loaded, is followed by a step 202, in which a dialog box is displayed, and then by a step 204, in which keyboard inputs made using the displayed dialog box are received by the portable computing system 10. These steps 202, 204 are similar to the corresponding steps 118, 120, described above in reference to FIG. 5, except that the dialog box does not include an entry box for a password, and a password is not accepted as part of the keyboard inputs.

Also, in the process 200 of the second embodiment, the determination in step 130 that a base public key is stored in the portable computing system 10, is followed by step 206, in which a code requesting transmission of a public key is transmitted. Then, after this code is received in step 208, the base computing system 12 proceeds directly to step 140, in which the base public key is transmitted to the portable computing system 10. In this way, many portable computing systems 10 can be initialized to be reset by a single base system 12, but once a portable computing system 10 has been so initialized, it cannot be initialized to be reset by another base system 12. If it is desirable to prevent the initialization of more than one portable computing 10 using the base system 12, a flag bit may be set in nonvolatile storage within the base system 12 with the transmission of the public key 140, with this location being checked before any such transmission occurs.

Furthermore, in the process 200 of the second embodiment, after the random number is stored by the portable computing system 10 in step 146, this number is transmitted to the base computing system 12 in step 210. There is no need for concatenation or for encryption at this point, since there is no password to transmit and protect. Then, after the random number is received by the base computing system 12 in step 212, it is encrypted with the private key of the base computing system 12 in step 162.

Finally, in the process 200 of the second embodiment, the error message is displayed in step 186 only after a determination in step 170 that the random number received from the base computing system 12 in step 166 and decrypted in step 168 does not match the random number previously stored in step 146.

While the invention has been described in its preferred embodiments with some degree of particularity, it is understood that these descriptions have been given only as examples, and that numerous changes may be made without departing from the spirit and scope of the invention.

What is claimed is:

1. A method for providing access to secure data through a portable computing system during a specified time, wherein said method comprises:

establishing a connection between said portable computing system and a base computing system to provide for transfer of data between said portable computing system and said base computing system;

verifying identity of said base computing system within said portable computing system;

resetting a timer within said portable computing system to run for a specified time; and providing access to said secure data only when said timer is running.

2. The method of claim 1, wherein verifying identity of said base computing system within said portable computing system comprises:

receiving and storing a public cryptographic key from said base computing system during an initialization process, following said initialization process, generating a random number within said portable computing system;

transmitting said random number to said base computing system receiving a number transmitted from said base computing system decrypting said number transmitted from said base computing system to form a decrypted number; and
determining that said decrypted number matches said random number.

3. The method of claim 1, additionally comprising a step of verifying whether a password is entered correctly in said portable computing system.

4. The method of claim 3, wherein said step of verifying whether a password is entered correctly includes:
transmitting an initial password to said base computing system during an initialization process,
storing said initial password within said base computing system;
following said initialization process, transmitting a present password to said base computing system;
determining in said base computing system that said initial password matches said present password;
transmitting an approval code from said base computing system to said portable computing system; and
determining that said approval code has been received.

5. The method of claim 1, wherein said connection is established through a switched telephone network.

6. The method of claim 1, wherein
said timer includes a timer register storing a number corresponding to a time remaining,
said number corresponding to a time remaining is decremented in response to a series of timing pulses generated within said portable computing system, and
setting said timer includes storing a number corresponding to said specified time in said timer register.

7. A method providing for access to secure data through a portable computing system, wherein said access to said secure data is limited to a specified time, and wherein said method comprises:
initializing a base computing system and said portable computing system to work together as a system by an initialization process comprising;
storing data identifying said base computing system within said portable computing system; and
resetting said portable computing system by a reset process following said initialization process including:
establishing a connection to transmit data between said portable computing system and a base computing system;
determining, using said data identifying said base computing system, that said connection has been made between said portable computing system and said base computing system;
setting a timer within said portable computing system to run until said specified time has expired;
determining if said timer is running; and
providing access to said secure data only when said timer is running.

8. The method of claim 7, wherein
said initialization process additionally includes determining whether said data identifying the base computing system has been previously stored in said portable computing system;
if said data identifying a base computing system is determined to have been previously stored, said data identifying a base computing system remains without being overwritten during said initialization process.

9. The method of claim 8, wherein said data identifying said base computing is a public cryptographic key of said base computing system, and wherein said process of determining that said connection has been made between said portable computing system and said base computing system includes:
generating and storing random number within said portable computing system;
transmitting said random number from said portable computing system to said base computing system;
encrypting said random number within said base computing system with a private cryptographic key of said base computing system to form an encrypted number;
transmitting said encrypted number from said base computing system to said portable computing system;
decrypting said encrypted number within said portable computing system with said public cryptographic key of said base computing system to form a decrypted number; and
comparing said decrypted number with said random number stored within said portable computing system.

10. The method of claim 8, wherein
said timer includes a timer register storing a number corresponding to a time remaining,
said number corresponding to a time remaining is decremented in response to a series of timing pulses generated within said portable computing system, and
setting said timer includes storing a number corresponding to said specified time in said timer register.

11. The method of claim 8, wherein
said method additionally comprises receiving an input corresponding to a time, and
setting said specified time according to said input.

12. The method of claim 8, additionally comprising storing a cryptographic public cryptographic key of said portable computing system within said base computer system.

13. The method of claim 8, wherein
said initialization process additionally includes receiving a present password as an input, determining if a password has been previously stored, and storing said present password in response to a determination that said password has not been previously stored,
said reset process additionally includes receiving a present password as an input and determining if said present password matches a stored password; and
said timer is set within said portable computing system only in response to a determination that said present password matches said stored password.

14. The method of claim 13, wherein
said present password is received as an input within said portable computing system,
said present password is transmitted from said portable computing system to said base computing system,
said present password is stored within said base computing system following a determination that a password is not previously stored within said base computing system;
a determination is made in said base computing system of whether said present password matches a stored password,
said reset process additionally includes transmitting an approval code from said base computing system to said portable computing system in response to a determination that said present password matches said stored password, and
said timer is set within said portable computing system in response to receiving said approval code.

15. The method of claim 14, wherein said data identifying said base computing is a public cryptographic key of said base computing system, and wherein said process of determining that said connection has been made between said portable computing system and said base computing system includes:

generating and storing random number within said portable computing system;

concatenating said random number and said present password within said portable computing system to form a concatenated number;

encrypting said concatenated number within said portable computing system with said public cryptographic key of said base computing system to form a first encrypted number;

transmitting said first encrypted number from said portable computing system to said base computing system decrypting said first encrypted number within said base computing system with a private cryptographic key of said base computing system to form a decrypted number;

dividing said decrypted number to form a decrypted random number and said present password;

encrypting said decrypted random number within said base computing system with a private cryptographic key of said base computing system to form a second encrypted number;

transmitting said second encrypted number from said base computing system to said portable computing system;

decrypting said second encrypted number within said portable computing system with said public cryptographic key of said base computing system to form a decrypted number; and comparing said decrypted number with said random number stored within said portable computing system.

16. A system for providing controlled access to secure data, wherein said system comprises:

a portable computing system providing said controlled access to secure data during a specified time, wherein said portable computing system includes first processing means, first storage means, and a timer;

a base computing system including second processing means and second storage means;

a connection between said portable computing system and said base computing system for transmitting data between said portable computing system and said base computing system; and a first program, executing within said first processing means, causing said portable computing system to perform a process including:

determining if a public cryptographic key is stored in a first location within said first storage means;

in response to determining that a public cryptographic key is not stored in said first location, transmitting a request code, receiving said public cryptographic key, and storing said public cryptographic key in said first location;

transmitting a first code;

receiving a response to said first code;

determining from said response to said first code if a connection has been made to said base computing system; and setting said timer to run until said specified time has expired;

a subroutine executing within said first processing means, causing said portable computing system to perform a process including:

determining if said timer is running; and providing access to said secure data only when said timer is running; and a second program, executing within said second processing means, causing said base computing system to perform a process including:

receiving said request code;

in response to receiving said request code, transmitting a public cryptographic key of said base computing system to said portable computing system;

receiving said first code; and in response to receiving said first code, transmitting said response to said first code.

17. The system of claim 16, wherein
said first storage means includes a timer register storing a number corresponding to a time remaining,
said number corresponding to a time remaining is decremented in response to a series of timing pulses generated within said portable computing system, and
setting said timer includes storing a number corresponding to said specified time in said timer register.

18. The system of claim 17, wherein
transmitting said first code includes generating a random number, storing said random number in a second location within said first storage, and transmitting said random number to said base computing system as said first code,
transmitting said response to said first code includes encrypting said random number with a private cryptographic key of said base computing system to form an encrypted random number, and transmitting said encrypted random number as said response to said portable computing system as said response to said first code, and
determining from said response to said first code if a connection has been made to said base computing system includes decrypting said encrypted number to form a decrypted number and comparing said decrypted number with said random number stored in said second location within said first storage.

19. The system of claim 18, wherein
said first processing means includes a first microprocessor and a first cryptographic processor,
said encrypted number is decrypted in said first cryptographic processor,
said first storage means includes first secure storage accessed only through
said first cryptographic processor, and
said first location and said timer register within said first storage means are within said secure storage.

20. The system of claim 18, wherein
said second processing means includes a second microprocessor and a second cryptographic processor,
said random number is encrypted to form said encrypted number within said second cryptographic processor,
said second storage means includes second secure storage accessed only through said second cryptographic processor, and
said private cryptographic key of said base computing system is stored within said second secure storage.

21. The system of claim 16, wherein
said portable computing system additionally includes a display,
said first program additionally causes a successful completion message to be displayed on said display in response to a determination from said response to said first code that a connection has been made to said base computing system, and said first program additionally causes an error message to be displayed on said display in response to a determination from said response to said first code that a connection has not been made to said base computing system.

22. The system of claim 16, wherein
said portable computing system additionally includes a display and a keyboard, and
said first program causes said portable computing to perform a process additionally including displaying a menu, receiving a user input from said keyboard as said menu is displayed, and determining said specified time from said user input.

23. The system of claim 16, wherein
said portable computing system additionally includes a display and a keyboard,
said first program causes said portable computing system to perform a process additionally including displaying a menu and receiving a password from said keyboard as said menu is displayed,
transmitting said first code includes:
  generating a random number;
  storing said random number in a second location within said first storage;
  concatenating said random number with said password to form a concatenated number
  encrypting said concatenated number with a private cryptographic key of said portable computer system stored in a third location within said first storage means to form said first code; and
  transmitting said random number to said base computing system as said first code, transmitting said response to said first code includes:
  decrypting said first code with a private cryptographic key of said base computing system stored in a fourth location within said second storage means;
  separating said password from said random number;
  determining whether said password separated from said random number matches a password stored;
  encrypting said random number with a private cryptographic key of said base computing system to form an encrypted random number, and
  in response to determining that said password separated from said random number matches said password stored, transmitting said encrypted random number as said response to said portable computing system as said response to said first code,
said second program causes said base computing system to perform a process additionally including:
  determining if a password is stored in a fifth location within said second storage means;
  in response to a determination that a password is not stored in said fifth location, storing said password separated from said random number in said fifth location
  in response to a determination that a password is stored in said fifth location, comparing said password stored in said fifth location with said password separated from said random number;
  in response to determining that said password stored in said fifth location matches said password separated from said random number, encrypting said random number and to form a transmitting an approval code to said portable computing system as said response to said first code; and determining from said response to said first code if a connection has been made to said base computing system includes determining that said approval code has been received.

24. The system of claim 23, wherein
said second program causes said base computing system to perform a process additionally including, in response to determining that said password stored in said fifth location does not match said password separated from said random number, transmitting an error code to said portable computing system as said response to said first code
said first program causes said portable computing to perform a process additionally including displaying a successful completion message on said display in response to receiving said approval code, and displaying an error message on said display in response to receiving said error code.

25. The system of claim 23, wherein
said first storage means includes a timer register storing a number corresponding to a time remaining,
said number corresponding to a time remaining is decremented in response to a series of timing pulses generated within said portable computing system, and
setting said timer includes storing a number corresponding to said specified time in said timer register.

26. The system of claim 23, wherein
said first processing means includes a first microprocessor and a first cryptographic processor,
said concatenated number is encrypted in said first cryptographic processor,
said first storage means includes first secure storage accessed only through said first cryptographic processor, and
said secure storage includes said first location, said third location, and said timer register within said first storage means.

27. The system of claim 23, wherein
said second processing means includes a second microprocessor and a second cryptographic processor,
said random number is encrypted to form said encrypted number within said second cryptographic processor,
said second storage means includes second secure storage accessed only through said second cryptographic processor, and
said fourth and fifth locations within said second storage means are within said second secure storage.

28. The system of claim 23, wherein
transmitting said request code includes transmitting a public cryptographic key of said portable computing system, and
receiving said request code includes storing said public cryptographic key of said portable computing system in a sixth location within said second storage means.

29. A computer readable medium within a portable computing system, wherein said computer readable medium has computer readable instructions for performing a method comprising:
  determining if a public cryptographic key is stored in a first location within said first storage means;
  in response to determining that a public cryptographic key is not stored in said first location, transmitting a request code, receiving said public cryptographic key, and storing said public cryptographic key in said first location;
  transmitting a first code;
  receiving a response to said first code;

determining from said response to said first code if a connection has been made to a base computing system; and setting a timer to run until a specified time has expired.

30. The computer readable medium of claim 29, wherein setting said timer includes storing a number corresponding to said specified time in a timer register.

31. The computer readable medium of claim 29, wherein transmitting said first code includes generating and storing a random number, and transmitting said random number to said base computing system as said first code, and determining from said response to said first code if a connection has been made to a base computing system includes decrypting an encrypted number to form a decrypted number and comparing said decrypted number with said random number.

32. The computer readable medium of claim 29, wherein said method additionally comprises:

displaying a successful completion message in response to receiving an approval code; and displaying an error message in response to receiving an error code.

33. The computer readable medium of claim 29, wherein said method additionally comprises:

displaying a menu;

receiving an input from a keyboard as said menu is displayed; and determining said specified time from said input.

34. The computer readable medium of claim 29, wherein said method additionally includes displaying a menu and receiving a password from a keyboard as said menu is displayed, said step of transmitting a first code includes:

generating a random number;

storing said random number in a second location within said first storage;

concatenating said random number with said password to form a concatenated number, encrypting said concatenated number with a private cryptographic key of said portable computer system stored in a third location within said first storage means to form said first code; and transmitting said random number to said base computing system as said first code.

35. In a portable computing system having a user interface including a display and a keyboard, a method for limiting access to secure data to a specified time, wherein said method comprises:

displaying a screen location for entering a number;

accepting an input from said keyboard;

displaying said input from said keyboard in said screen location;

calculating a number determining said specified time as a function of said input from said keyboard;

generating a random number;

transmitting said random number to a base computing system;

receiving an encrypted number from said base computing system, decrypting said encrypted number with a public cryptographic key stored within said portable computing system to form a decrypted number;

determining if said random number matches said decrypted number; and in response to determining that said random number matches said decrypted number, setting a timer within said portable computing system to run for said specified time, wherein said access to secure data is provided only when said time is running.

36. The method of claim 35, additionally comprising:

displaying a successful completion message in response to determining that said random number matches said decrypted number; and displaying an error message in response to determining that said random number does not match said decrypted number.

37. In a portable computing system having a user interface including a display and a keyboard, a method for limiting access to secure data to a specified time, wherein said method comprises:

displaying a first screen location for entering a password and a second screen location for entering a number;

accepting a first input from said keyboard;

generating a password from said first input;

accepting a second input from said keyboard;

displaying said input from said keyboard in said second screen location;

calculating a number determining said specified time as a function of said second input from said keyboard;

generating a random number;

encrypting said password with a public cryptographic key stored in said portable computing system;

transmitting said random number to a base computing system;

receiving an encrypted number from said base computing system, decrypting said encrypted number with said public cryptographic key stored within said portable computing system to form a decrypted number;

determining if said random number matches said decrypted number; and in response to determining that said random number matches said decrypted number, setting a timer within said portable computing system to run for said specified time, wherein said access to secure data is provided only when said timer is running.

38. The method of claim 35, additionally comprising:

displaying a successful completion message in response to determining that said random number matches said decrypted number; and displaying an error message in response to determining that said random number does not match said decrypted number and in response to receiving an error code from said base system.

39. The method of claim 1, wherein said access to secure data is provided to said secure data with said portable computing system being connected to transmit and receive data from said base computing system on a periodic basis.

40. The method of claim 7, wherein said access to secure data is provided to said secure data with said portable computing system being connected to transmit and receive data from said base computing system on a periodic basis.

41. The system of claim 16, wherein said access to secure data is provided to said secure data with said portable computing system being connected to transmit and receive data from said base computing system on a periodic basis.

42. The method of claim 35, wherein, within said method, said access to secure data is provided to said secure data with said portable computing system being connected to transmit and receive data from said base computing system on a periodic basis.

43. The method of claim 37, wherein, within said method, said access to secure data is provided to said secure data with said portable computing system being connected to transmit and receive data from said base computing system on a periodic basis.

44. A portable computer including data storage storing secure data;

communication means for connection to a base computer for data exchange;

and processor means executing a security timer program including:

establishing a connection between said portable computing system and a base computing system to provide for transfer of data between said portable computing system and said base computing system;

verifying identity of said base computing system within said portable computing system;

resetting a timer within said portable computing system to run for a specified time; and providing access to said secure data only when said timer is running.

45. The portable computer of claim 1, wherein said step or verifying identity of said base computing system comprises:

receiving and storing a public cryptographic key from said base computing system during an initialization process, following said initialization process, generating a random number within said portable computing system;

transmitting said random number to said base computing system;

receiving a number transmitted from said base computing system;

decrypting said number transmitted from said base computing system to form a decrypted number; and determining that said decrypted number matches said random number.

46. The portable computer of claim 44, additionally comprising a keyboard for data entry, wherein said method additionally comprises a step of verifying whether a password is entered correctly through said keyboard.

47. The portable computer of claim 46, wherein said step of verifying whether a password is entered correctly includes:

transmitting an initial password to said base computing system during an initialization process, storing said initial password within said base computing system;

following said initialization process, transmitting a present password to said base computing system;

determining in said base computing system that said initial password matches said present password;

transmitting an approval code from said base computing system to said portable computing system; and determining that said approval code has been received.

48. The portable computer of claim 44, wherein said connection is established through a switched telephone network.

49. The portable computer of claim 44, wherein said timer includes a timer register storing a number corresponding to a time remaining, said number corresponding to a time remaining is decremented in response to a series of timing pulses generated within said portable computing system, and setting said timer includes storing a number corresponding to said specified time in said timer register.

* * * * *